United States Patent [19]
Courtright

[11] 4,240,584
[45] Dec. 23, 1980

[54] AGRICULTURAL VEHICLE

[75] Inventor: Burr Courtright, La Grande, Oreg.

[73] Assignee: CH₂O, Inc., La Grande, Oreg.

[21] Appl. No.: 955,017

[22] Filed: Oct. 26, 1978

[51] Int. Cl.³ .............................................. B05B 3/18
[52] U.S. Cl. ................................... 239/189; 239/191
[58] Field of Search .............. 239/189, 191; 180/6.48; 137/344

[56] References Cited

U.S. PATENT DOCUMENTS

| | | | |
|---|---|---|---|
| 1,658,202 | 2/1928 | Jones . | |
| 2,057,217 | 10/1936 | Soper | 239/189 |
| 2,122,596 | 7/1938 | Turner . | |
| 2,941,727 | 6/1960 | Zybach | 239/177 |
| 3,043,520 | 7/1962 | Nelson | 239/189 |
| 3,415,451 | 12/1968 | Karmann | 239/191 |
| 3,444,941 | 5/1969 | Purtell | 137/14 |
| 3,477,643 | 11/1969 | Bruninga | 239/189 X |
| 3,628,731 | 12/1971 | Phillips | 239/189 |
| 3,684,178 | 8/1972 | Friedlander | 239/189 |
| 3,848,625 | 11/1974 | Courtright | 137/344 |
| 3,848,805 | 11/1974 | Courtright | 239/189 |
| 3,980,098 | 9/1976 | Courtright | 137/344 |
| 4,006,860 | 2/1977 | Cornelius et al. | 239/212 |
| 4,015,366 | 4/1977 | Hall | 239/191 |
| 4,043,416 | 8/1977 | Albright et al. | 180/6.48 |
| 4,142,547 | 3/1979 | Courtright | 137/344 |
| 4,151,858 | 5/1979 | Courtright | 137/344 |

FOREIGN PATENT DOCUMENTS 217436  5/1958  Australia .

*Primary Examiner*—Robert W. Saifer
*Attorney, Agent, or Firm*—M. Ralph Shaffer

[57] ABSTRACT

An agricultural field unit taking the form of a vehicle for applying by spray means irrigation water or other fluids to crops. The unit is powered during its operational run by the same water supply that provides the irrigation water for spraying purposes. A winch and winch cable are employed to mark exactly the destination point for the vehicle during its water-powered run. The vehicle carries a hose reel the hose of which is alternately transported, attached to a water pressure source and spooled off the reel during a primary vehicle run, and then coupled to the fluid inlet of the vehicle and dragged thereby over the field during the intended sprinkling operation.

6 Claims, 12 Drawing Figures

AGRICULTURAL VEHICLE

FIELD OF INVENTION

The present invention relates to irrigation apparatus and, more particularly, to an agricultural, spray-irrigation vehicle which is both water-propelled, during the irrigation run, and also supplied auxiliary power plant means for moving the vehicle, laying the winch cable, reeling the supply hose, and otherwise performing necessary functions.

Certain patents, including many of the inventor's prior patents are pertinent. These are the following:

No. 217,436 (Australia)
U.S. Pat. No. 2,941,727
U.S. Pat. No. 3,444,941
U.S. Pat. No. 3,848,625
U.S. Pat. No. 3,848,805
U.S. Pat. No. 3,980,098
U.S. Pat. No. 4,006,860
U.S. Pat. No. 1,658,202
U.S. Pat. No. 2,122,596
U.S. Pat. No. 3,043,520
U.S. Pat. No. 3,628,731
U.S. Pat. No. 4,151,858
U.S. Pat. No. 4,142,547

None of the above art, however, teaches the unit described and claimed herein, especially a mechanism wherein the irrigation unit self-contains the hose reel and means for winding the hose on the reel after an irrigation run has been completed. There are other advantages absent in the present invention, namely, in the types of structure employed for free-spooling the hose to the hose reel and the winch cable of the winch structure, as well as the powering of the vehicle and its components for particular purposes, all absent in the prior art cited.

BRIEF DESCRIPTION OF THE INVENTION

According to the present invention a vehicle has drive structure accommodating an operator and also a power plant or engine such that the vehicle may be propelled to a starting position, for cable anchoring purposes, and also for performing other functions as herein set forth. Means are provided for coupling and also uncoupling the hose reel and the winch for power drives and also free spooling. Hydraulic jack means is employed to ratchet gear structure that is operatively associated with the winch, whereby the winch can be positively driven and the unit dragged or rolled by the winch action toward the anchor point associated with the winch cable. The carrying by the vehicle itself of the hose reel accomplishes a number of important purposes including, not only transport of the hose reel but also provision for its winding of the hose during particular times of the cycle of operation of the vehicle.

OBJECTS

Accordingly, a particular object of the present invention is to provide a new and improved vehicle for crop spraying purposes, including irrigation, herbicidal treatment and so forth.

An additional object is to provide an agricultural vehicle that is water propelled and additionally, auxiliary engine driven.

An additional object is to provide in an agricultural unit a hose reel in combination with hydraulic jack or other means suitable for powering the winch of a winch cable drawn system.

BRIEF DESCRIPTION OF DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

BRIEF DESCRIPTION OF PREFERRED EMBODIMENTS

Figure 1:
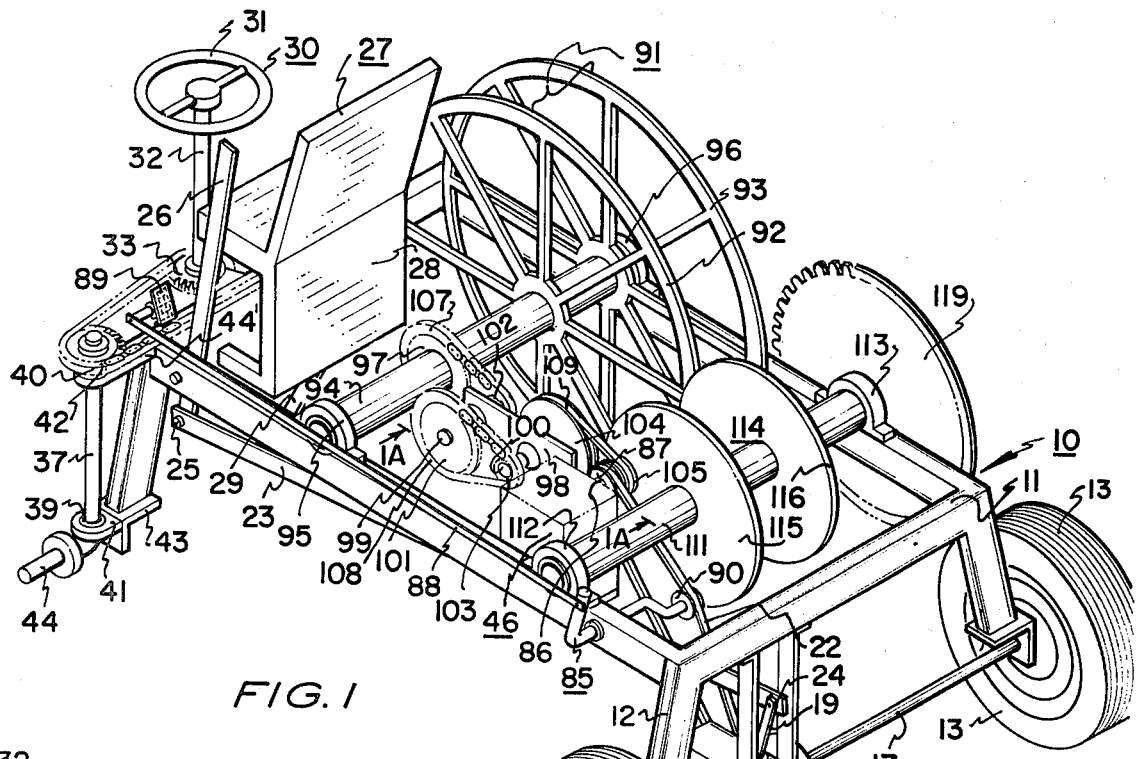
FIG. 1 is a perspective view of a major portion of the construction of the vehicle in accordance with one embodiment of the present invention.
Figure 2:
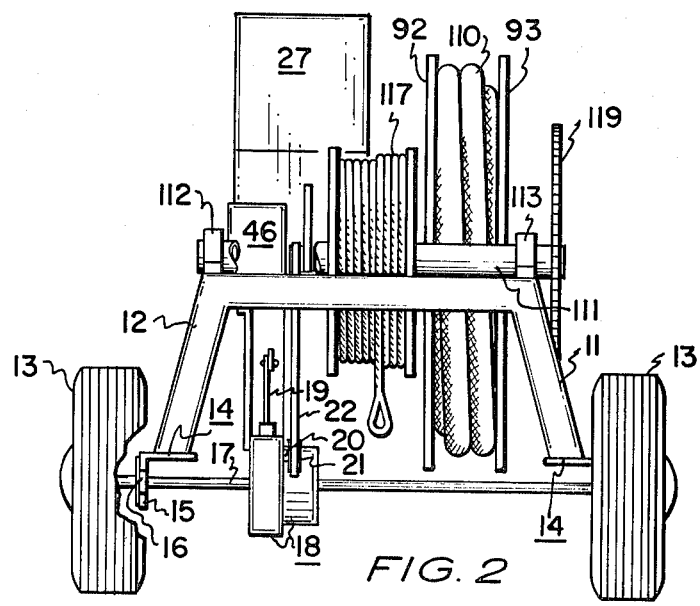
FIG. 2 is a rear elevation of the structure of FIG. 1.
Figure 3:
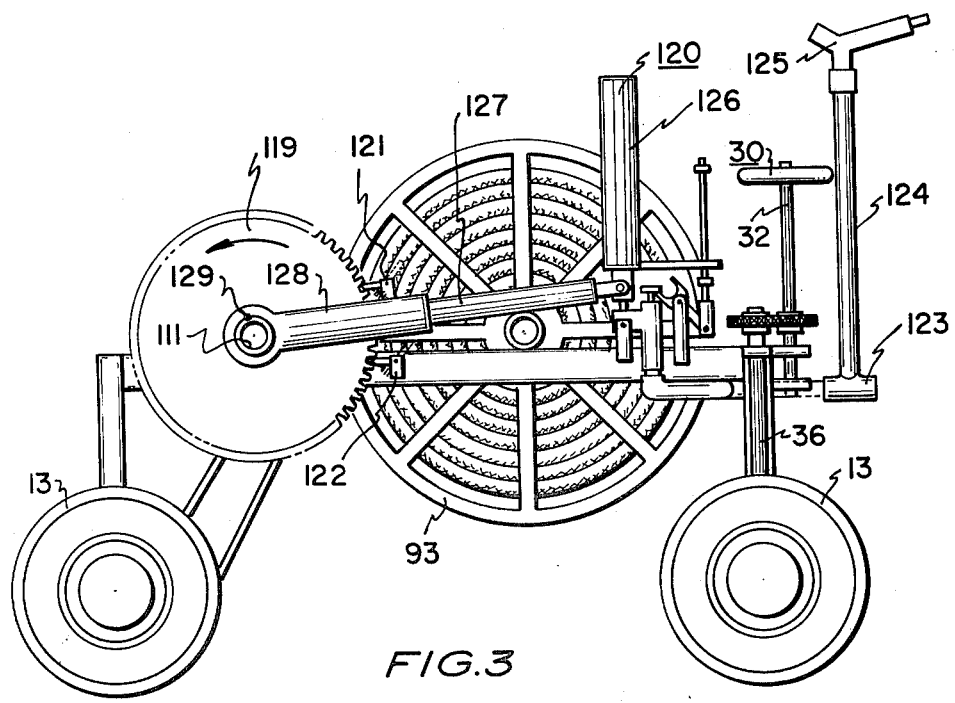
FIG. 3 is a right side elevation of the structure of FIG. 2.
Figure 4:
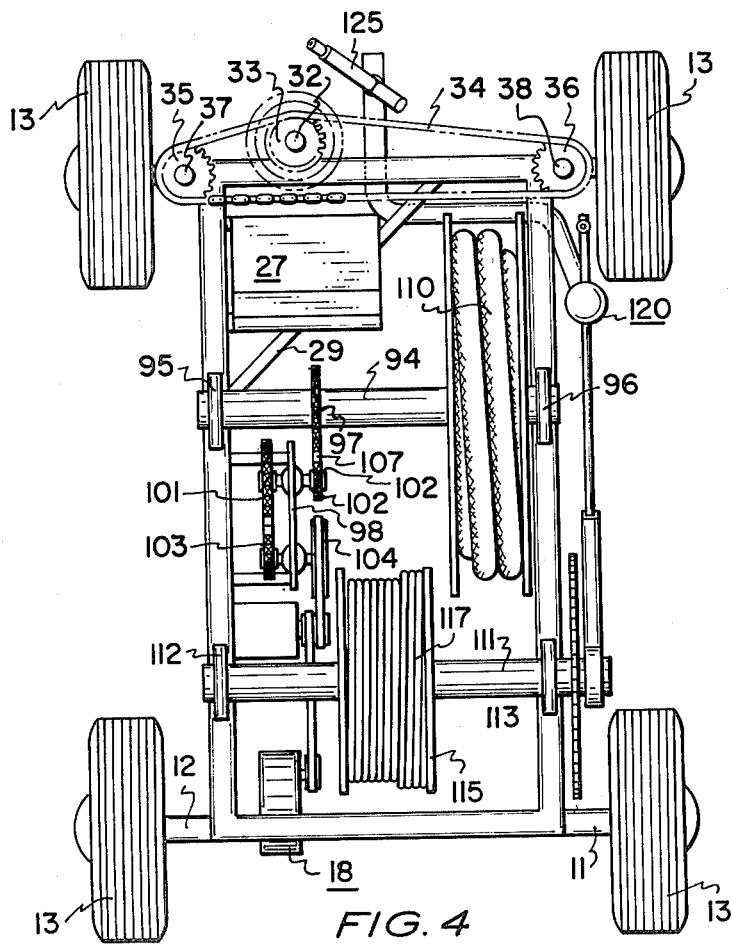
FIG. 4 is a plan view of the structure of FIGS. 1 and 3.
Figure 5:
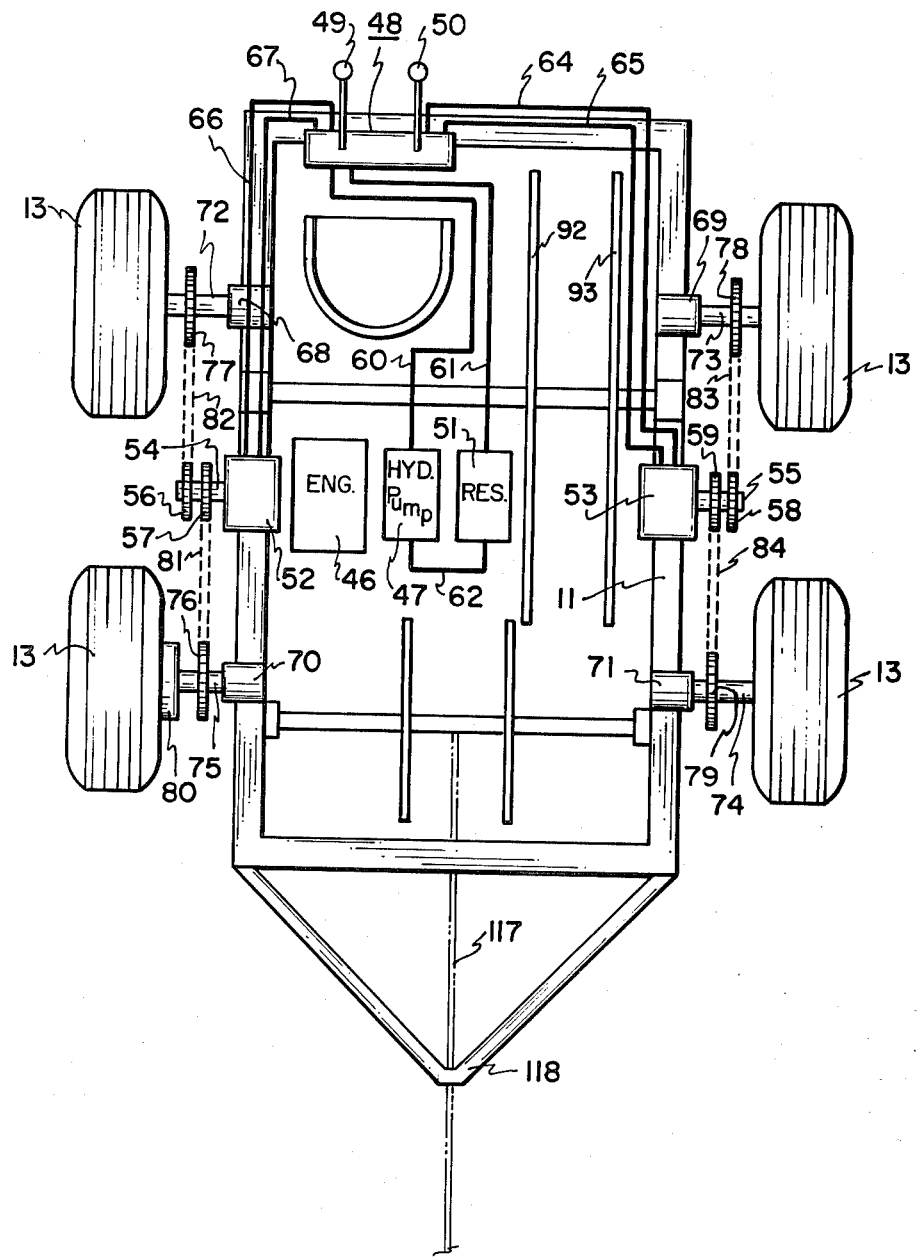
FIG. 5 is a plan view of structure similar to that shown in FIG. 4, but which includes a wheel drive system incorporating hydraulic features.

In referring to FIGS. 1-4 the vehicle 10 is shown to include a frame 11, the latter having depending leg portions 12 for accommodating the four wheels 13. The mounting of the two wheels 13 at the rear of the vehicle is shown in FIG. 2, wherein the depending legs 12 have brackets 14 the vertical depending flanges 15 of which include journals 16 for receiving axle 17. Axle 17 forms part of a standard trans-axle unit 18 which is conventional in the art and which includes a transmission shift control 19. Trans-axle 18 includes an input drive 20 provided with pulley 21 that operationally receives belt 22 which may comprise a V-belt, by way of example. Thus, the V-belt 22 drives the trans-axle unit 18 at a speed in accordance with the selected positioning of shift control 19. The right rear wheel 13 in FIG. 2 is mounted similarly as to that shown to the left of the vehicle in FIG. 2. The shift lever or shift control 19, see FIGS. 1 and 2, is linked by an elongate bar 23, pivoted at opposite ends at 24 and 25 to the shift lever 19 and to primary shift lever 26 near operator station 27. The operator station 27 includes a driver seat 28 that can be appropriately mounted to suitable structure 29. The operator's steering mechanism 30 includes a steering wheel 31 and a shaft 32 to which pinion gear 33 is keyed. Pinion gear 33, see FIG. 4, meshes with an endless sprocket chain 34 that encompasses opposite spur gears 35 and 36. These latter gears are pinned to shafts 37 and 38 that are journaled in bushings 39 and 40 in respective ears 41 and 42. Ear 41 forms a part of bracket 43 as shown in FIG. 1. The ear 42 forms an extension of plate 44' that is secured to frame 11. The structure at opposite sides of the front portion of the vehicle is identical for the respective front wheels 13 near the driver station in FIGS. 1 and 4. Accordingly, it is seen that a pivotal displacement of the steering wheel will produce a corresponding displacement of gear 33 so as to turn automatically the spur gears 35 and 36. This action in turn pivots the respective axle 44 of the respective front wheels 13 so that the vehicle may be conveniently steered by the operator. Engine 46 will be provided in any event for purposes to be described in connection with FIGS. 1-4. At this juncture, however, it will be noted that in an alternative form of the invention, see FIG. 5, the engine 46 may be used additionally to power a hydraulic pump 47. Standard valve means 48 is provided with a pair of hydraulic shifting controls 49 and 50. Reservoir 51 will likewise be provided and suitably mounted or supported by frame 11. Standard orbit motors 52 and 53 are mounted to opposite sides of frame 11 and include output shafts 54 and 55 that re respectively provided sprockets 56-59 as indicated. Hydraulic pressure line 60 leads from and is connected to the pressure side of hydraulic pump 47 and leads to valve 48. Return line 61 comes from valve 48 to reservoir 51, and a reservoir line 62 couples back to the input side of hydraulic pump 47. Pressure and return lines 64 and 65, respectively, connect between the valve 48 and orbit motor 53. Correspondingly, hydraulic lines 66 and 67, one being a pressure line and the other being a return line, connect to the standard hydraulic fittings of orbit motor 52. Suitable journaling means 68-71 journal wheel axles 72-75. Sprockets 76-79 are mounted as indicated relative to the several wheel shafts, and the wheels themselves at 13 are either keyed directly to the shaft or are mounted to the output drives of standard variable-reversible oil motors, one for each wheel, and solely one being shown in the drawings at 80. Sprocket chains 81-84 intercouple the various sprockets as indicated in FIG. 5.

In operation, as to the engine drive system of the vehicle, engine 46 simply drives the trans-axle unit 18 to power the rear wheels, this by belt 22, and the tensioning thereby being accomplished by clutch control 85 and the powering of belt 22 by engine 46. Or the engine 46, preferably of the internal combustion type, may be used to power hydraulic pump 47 (see FIG. 5) that in turn is employed to supply pressured fluid in line 60, through valve 48 so as to operate the orbit motors 52 and 53. These in turn power the shafts 54 and 55 so as to drive sprockets 56-59 to produce a rotation in the sprockets 76-79 and the several wheels 13. In connection with the structure shown in FIG. 5, and by virtue of the inclusion of valve controls 49 and 50, the wheels may be rotated as a four-wheel drive to move either forwardly, in a reverse direction, or the wheels on opposite sides of the vehicle may be rotated in opposite directions so as to accomplish a very sharp, small radius turns, all of this depending upon the controls of valves 49 and 50. Valve 48 is of the standard, two-portion four-way valve type for producing the functions indicated in FIG. 5 and hitherto described.

As to the FIG. 1 structure and in completing the description of the engine drive unit and function, engine 46 has an output shaft 86 provided with keyed pulley 87. This pulley is engaged by V-belt 22 that drives the trans-axle at trans-axle pulley 21. Clutch control 85 is provided with tie rod 88 that leads to foot control 89. Accordingly, the foot control may be used, either in a direct or over-toggle construction, to set and release the clutching unit and thus cause an engagement or disengagement, in a pressured action, of clutch pulley 90 with V-belt 22. Accordingly, and as is conventional with many types of equipment, the clutch control either produces a tensioning of the belt so as to drive the trans-axle or contributes to a production of slack in the belt so that the positive drive of the trans-axle is effectively terminated. This feature per se forms no part of the present invention, standing alone.

In returning to a consideration of the basic structure, see FIG. 1, hose reel 91 includes a pair of web flanges 92 and 93 and a central shaft 94 to which the flanges are welded or otherwise secured and which itself is journaled by journaling means 95 and 96 to frame 11. Sprocket 97 is keyed to shaft 94. A plate 98 is fixedly mounted relative to the frame, as by securement to motor or engine 46, and includes a pair of shafts 99 and 100 that are journaled to the plate 98 and which include chain sprockets 101 and 102, also sprocket 103 and belt pulley 104, these being respectively keyed to the respective shafts 99 and 100. Drive pulley 105 is secured to engine shaft 86. Sprocket chains 107 and 108 interconnect the sprocket pair 97-102 and the sprocket pair 101-103 together as indicated. And V-belt 109 connects pulley 104 with pulley 105. Accordingly, the powering of the motor or engine 86 will produce, via the V-belt and sprocket chains previously indicated, a rotation of shaft 94 so as to revolve the hose reel 91. The engine, of course, can include a reversing feature. However, since it is believed more appropriate simply to allow the hose to free-spool off the reel, see hose 110, when the same is desired, then the powering of the hose reel shaft 94 need only be in one direction, i.e. to wind the hose upon the wheel when such operation is desired. The total operation of the vehicle and this hose reel feature will be described hereafter. A second shaft, i.e. shaft 111 is journaled to frame 11 by means of suitable journaling means 112 and 113 that are mounted to the frame. Shaft 111 comprises a portion of a winch 114 which includes winch reel flanges 115 and 116. These latter receive between the same a winch cable 117 which spools rearwardly from the frame and which may include a cable guide structure as at 118 in FIG. 5, for example. Keyed to shaft 111 is a bull gear 119 that is free to be rotationally displaced, and in fact is so displaced by a hydraulic jack system 120, the operation of which is described in the inventor's issued U.S. Pat. No. 3,980,098 and which is now fully incorporated herein by way of reference. Such a system includes the spring-loaded dogs and their structures at 121 and 122 fully explained in the inventor's prior patent above mentioned. These dogs can be over-toggled to allow for the free spooling of the winch cable shaft or, alternatively, re-engaged to the position shown in FIG. 3 wherein the hydraulic jack 120 is employed to torque the shaft 111 in a series of incremental movements in accordance with the motion of the jack 120. The jack 120 itself is supplied water pressure at tee 123, the same accommodation also vertical riser 124 that incorporates the water spray unit 125. Various structure of the water jack is illustrated and completely explained in the aforementioned U.S. patent. No further explanation herein is deemed required other than to simply point out that as the cylinder 126 is advanced up and down sequentially, a ratcheting affect takes place by virtue of lever arm 127 that telescopingly slips into lever arm 128 and, since the latter is keyed at 129 to the shaft 111, a series of successive rotational displacements occur so as to torque the winch. The dog structures 121 and 122 are disengaged from bull gear 119 when it is desired simply for the winch cable to free-spool from the winch structure including the winch structure at 14, including flanges 115 and 116, and the winch shaft portion 111 disposed between such flanges. When, on the other hand, the vehicle is to be powered driven by the winch, then the dog structures at 121 and 122 are re-engaged with bull gear 119 so that the vehicle can be retracted simply by the powering of hydraulic pressure to tee 123, whereupon the winch simply winds upon its cable, thus drawing the vehicle to the starting point where the cable is anchored.

Figure 6:
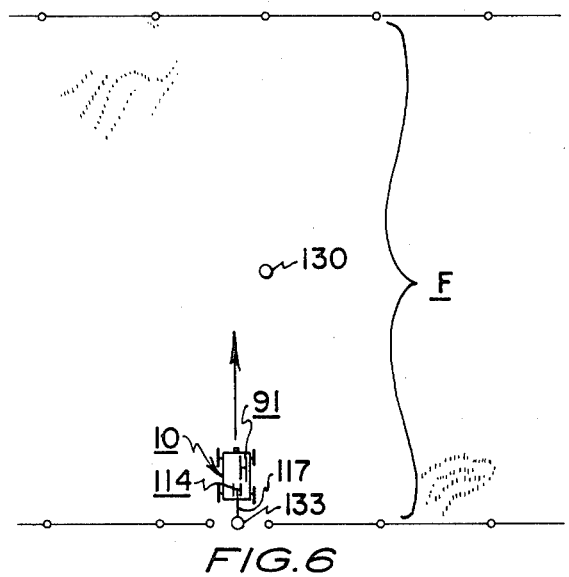
FIGS. 6 through 11 are respective plan views of an agricultural field showing, from starting position, progressive steps in the cycle of operation of the vehicle in spraying an agricultural field, FIG. 6 showing a starting point of operation and FIG. 11 the finish of such cycle of operation.

The operation of the equipment is shown and illustrated in FIGS. 6–11. Thus, the vehicle unit 10 is driven to an essential starting point as shown in FIG. 6, at which point the end of the winch cable 117 is tied to a stake or other anchor at 133. Again, the initial movement of the vehicle is accomplished by engine 46, and this whether the FIG. 1 or the FIG. 5 embodiment is employed, by way of example. The vehicle is thus at this time operator driven.

Figure 1A:
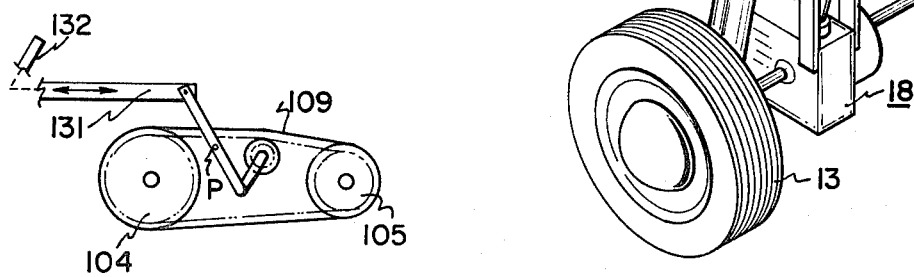
FIG. 1A is a schematic detail taken along the lines 1A—1A in FIG. 1, illustrating the clutching mechanism associated with the drive of the winch structure of the vehicle.
Figure 7:
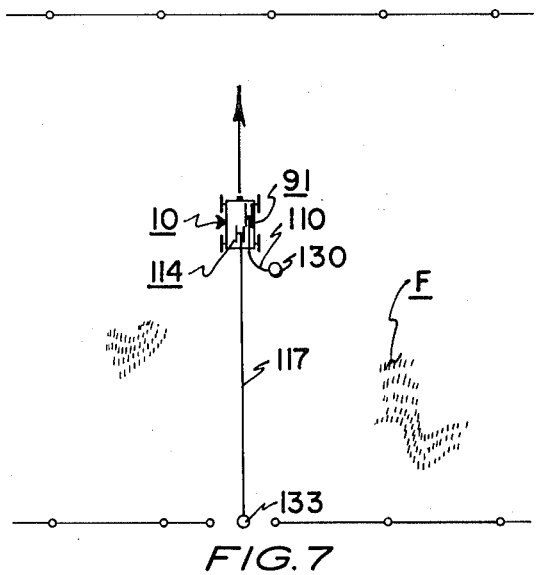
Figure 8:
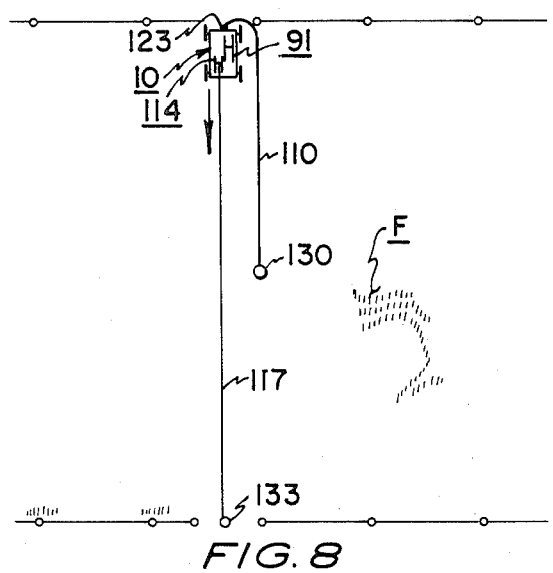

Once the winch cable is anchored at stake 120 in FIG. 6 then, with the pawl structures 121 and 122 disengage relative to bull gear 119, the winch cable is allowed to free spool from the winch drum of winch mechanism 114 while the vehicle is operator driven forwardly to the position shown in FIG. 7. At this point the end of the hose reel is attached to water pressure source 130 by any convenient coupling; however, the pressure source is not turned on at this time. Rather, the driver continues driving the vehicle forwardly, once he has stopped the same to perform the coupling operation with regard to special unit 130, until he reaches the end of the field as shown in FIG. 8. At this point the hose reel has completely been unwound, whereby the hose lies on the ground and is ready for coupling at its remote end to the key 123 in FIG. 3. While the engine or the structure may have a reversing feature, it is likewise possible, as shown in FIG. 1A to incorporate an additional pulley-type clutch in connection with the belt drive 19 associated with pulleys 104 and 105. This may be accomplished by tie rod 131 and actuator 132 in a manner similar to that shown in connection with tie rod 88 and control 89 in FIG. 1. Thus, tension may be applied or released relative to the belt 109 so that the drive may be selectively coupled to and uncoupled from the hose reel 91 including shaft 94.

In returning to a consideration of FIG. 7 it is seen that it is very simply for the hose reel hose to free-spool off the reel, at that portion of shaft 94 contained between webs 92 and 93 while the vehicle simply is in motion as shown in FIG. 7.

In any event, once the end of the proposed run has been reached, then the engine 46 is turned off, the hose 110 is attached to the coupling of tee 123, and the water is turned on at any convenient place, possibly right at the pressure supply at 130. This subsequent to the return of the pawls 121 and 122 to the positions indicated in solid line in FIG. 3.

Figure 9:
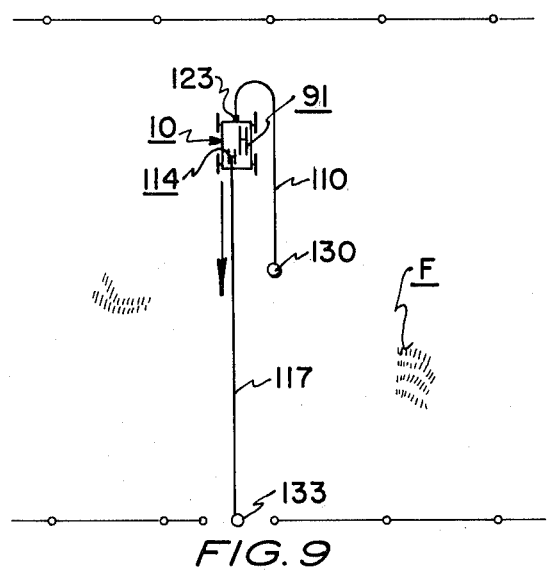
Figure 10:
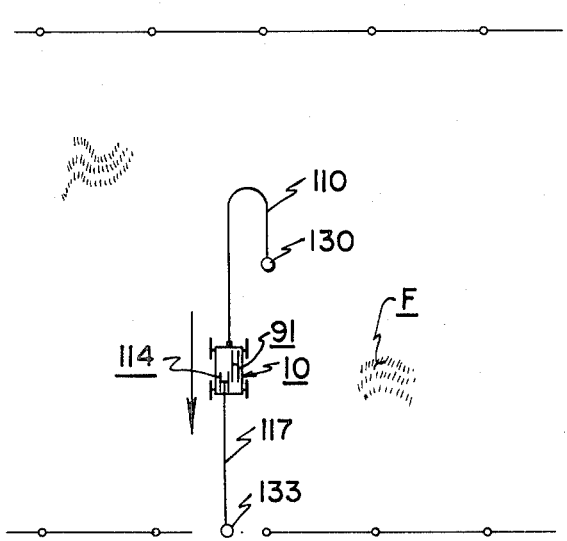
Figure 11:
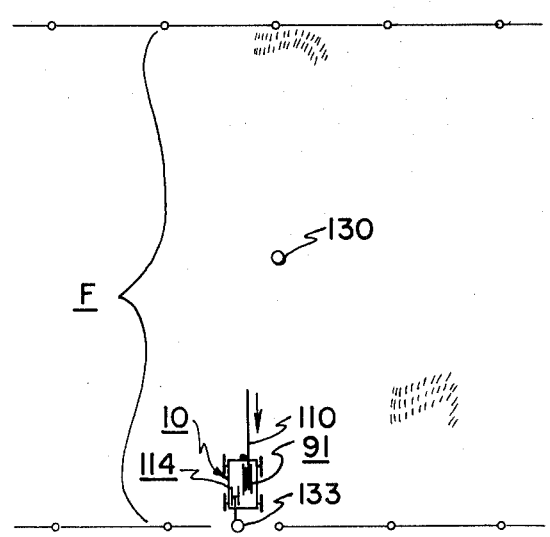

With the pawl structures re-engaged at 121 and 122 to the bull gear 119, and then, subsequently, with the water turned on to the now connected hose 110 of the hose reel, the unit is ready automatically return in the direction shown by the arrow in FIG. 8, the winch 114 now being operative to wind upon its own cable positively so as to pull forwardly and toward the stake 133 in the manner shown in FIGS. 8 and 9. Accordingly, water pressure supplies the spray at nozzle 125, and, in addition, drives the hydraulic jack structure 120 so as to ratchet bolt gear 119, all in the manner as shown in the inventor's prior patent aforementioned. The unit continues to the starting point at 133 in FIG. 10, at which point the operator simply shuts off the water at the pressure source, at 130. Then the operator starts the engine 46 after tightening belt 19 in FIG. 1A by the clutch engagement structure at 131 and 132, so that the hose reel now is positively driven by the engine to wind up the hose. This is accomplished, of course, after the hose is disconnected from tee 123 and the appropriate hose end initially wrapped about and secured at that portion of shaft 94 between the hose reel webs 92 and 93. Accordingly, the hose is now wrapped upon the hose reel and once this is accomplished the unit is ready for movement to a next position. FIG. 11 illustrates the final winding of the hose 110 about its reel 91.

The operation of the structure is such that, by virtue of the winch mechanism, the unit can be driven directly by water pressure as the unit is pulled by virtue of the winch winding on its own cable. The structure is made so that the unit thus easily travels directly to the source at which point the winch cable is anchored. It is noted that no operator is or need be present during the progressive sprinkling action of the unit. The engine need not be employed at all in connection with the winch; rather, the winch cable free spools from the winch when the unit is traveling outwardly as shown in FIGS. 6 and 7.

What is provided, therefore, is a water driven unit whereby the same source of water that is employed to do the sprinkling is also used to power the vehicle. As a second feature, the unit self-contains the hose reel that is advantageously employed to transport the hose from place to place and to carry the same between positions, likewise to drag the hose automatically while the sprinkling operation is being attended to. Means are provided for steering and driving the vehicle to intended points of operation, and likewise for positively coupling the hydraulic jack structure to the winch so that the same can be powered hydraulically to advance the vehicle appropriately during the sprinkling operation.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An agricultural machine including, in combination: a wheel-supported vehicle provided with a frame supplied wheels; manually operable means mounted to said frame for steering said vehicle; a winch, including a field-anchorable winch-cable, carried by said frame; hydraulic means comprising upstanding reciprocating hydraulic jack means for selectively powering said winch to power-wind said winch-cable, whereby to move said vehicle along said winch-cable as the latter winds upon said winch; fluid-spray delivery means carried by said frame; coupling means for coupling via respective branches pressured fluid from an external source to said hydraulic means and also to said fluid-spray delivery means; and auxiliary, mechanical power means, self-contained by said vehicle and mounted to said frame, for selectively powering said vehicle at times when said winch is non-operating.

2. The structure of claim 1 wherein said hydraulic jack means comprises an upstanding reciprocating hydraulic jack mechanism, having a piston anchored to said frame and an upstanding movable, reciprocating cylinder cooperable with said piston and coupled to said winch, for successively ratcheting said winch in its intended operation.

3. The structure of claim 2 wherein said winch includes a gear, said mechanism including adjustable pawl means selectively engaging said gear.

4. The structure of claim 1 wherein said fluid-spray delivery means comprises a riser conduit provided with a top connected sprinkler.

5. The structure of claim 1 wherein said mechanical power means comprises: an engine, a hydraulic pump coupled to said engine, and a hydraulic system coupled to and between said hydraulic pump and said wheels, said steering means comprising valve control means operably disposed in said hydraulic system.

6. The structure of claim 5 wherein hydraulic system and said steering means are constructed to produce both similar and also opposite wheel revolvement on opposite sides of said vehicle.

* * * * *